United States Patent [19]

Gibbons et al.

[11] 4,164,443
[45] Aug. 14, 1979

[54] HYDRAULIC FUEL HOLD DOWN

[75] Inventors: John F. Gibbons, Windsor; Robert L. Hellens, West Simsbury, both of Conn.

[73] Assignee: Combustion Engineering, Inc., Windsor, Conn.

[21] Appl. No.: 793,585

[22] Filed: May 4, 1977

[51] Int. Cl.² .............................................. G21C 3/12
[52] U.S. Cl. .................................. 176/50; 176/36 R; 176/61
[58] Field of Search .................... 176/50, 87, 61, 38, 176/36 R, 86 R

[56] References Cited
U.S. PATENT DOCUMENTS 3,235,465  2/1966  McDaniel et al. ...................... 176/61
3,801,734  4/1974  West ........................................ 176/50

FOREIGN PATENT DOCUMENTS 1012433  12/1965  United Kingdom ...................... 176/50

Primary Examiner—Harvey E. Behrend
Attorney, Agent, or Firm—Edward L. Kochey, Jr.

[57] ABSTRACT

A nuclear reactor having a seal plate dividing the vessel into an upper high pressure plenum and a lower low pressure or outlet plenum. A piston is located at the seal plate with its upper surface exposed to the high pressure and its lower surface exposed to the lower pressure. A push rod attached to the piston extends downwardly in butting relationship with fuel assemblies to hold them down.

7 Claims, 3 Drawing Figures

HYDRAULIC FUEL HOLD DOWN

BACKGROUND OF THE INVENTION

This invention relates to nuclear reactors and in particular to an apparatus for holding down fuel assemblies within the reactor core.

In pressurized water reactors the coolant flow rate and fuel assembly flow resistance are such that the hydraulic uplift force is of sufficient magnitude to cause the assemblies to jitter and even lift off the core support structure. Various approaches have been used to eliminate this detrimental movement.

One suggested solution involves the use of a lock down device which attaches the lower end of the fuel assemblies to the core support structure. While this device will function properly it does introduce mechanical complexity since the device must not only lock and unlock remotely but it must release reliably after a year of operation in the reactor environment.

Another approach has been to use springs located above each fuel assembly which bear against an upper alignment plate, thereby urging the fuel assemblies down. As reactors have been designed with increasingly large hydraulic uplift forces the spring force and the springs have become very large. Any component at this location limits the ability to obtain a desirable flow pattern and tends to increase the pressure drop of the coolant.

In the design of nuclear reactors, a loss of coolant accident must be considered which involves a break of either the inlet or outlet line connected to the reactor vessel. In the event of a break of the outlet line the increased flow results in a substantial increase in the upward force on the fuel assemblies. A break of the inlet line on the other hand reverses the flow direction. Steam generated in the core remains behind as a steam pocket and forces the water backwardly through the core to the break at the inlet line. It would be desirable to maintain the water within the core while permitting the steam to escape through the break.

SUMMARY OF THE INVENTION

It is an object of the invention to hold down fuel assemblies in a simple manner which will eliminate or reduce the need for spring hold down forces and in a manner which will minimize flow restrictions due to the hold down structure. It is a further object to introduce these forces in a manner which will compensate for variations in the primary flow through the reactor with concomitant variations in upward force on the fuel assemblies. It is a further object to provide a steam release path through the reactor in the event of an inlet line break where the invention is used with the preferred embodiment.

These and other objects are achieved in the invention wherein a nuclear reactor vessel is divided by a seal plate structure into a high pressure upper plenum and a low pressure plenum. A piston is in sealing and sliding relationship with the seal plate structure and it has push rods attached thereto which extend downwardly and hold down the fuel assemblies of the core. The piston in the preferred embodiment is located above the seal plate and seals against vertical extensions on the seal plate structure.

The high pressure plenum is directly connection to the reactor vessel inlet and, therefore, the pressure above the piston approximates the inlet pressure. The lower surface of the piston is in direct fluid communication with the reactor vessel outlet and, therefore, the pressure below the piston approximates the reactor vessel outlet pressure. The pressure difference acting on the piston is a function of the pressure difference through the reactor and, therefore, the hold down force inherently compensates for differences in flow through the reactor.

The substantial portion of the hold down structure is out of the primary fluid flow path since it is located at or above the seal plate structure. Only the tubular push rod which surrounds the control rod extends down toward the primary flow path. This push rod also forms a flow path for downward flow of coolant which is passing from the upper plenum downwardly to cool the control rods.

The close seal between the piston and the seal plate structure is effected above the seal plate whereby adjustments may be made and installation effected prior to placing the core alignment barrel on the fuel assemblies. Assembly of the reactor is thereby simplified since the close fitting tolerances need not be handled during this operation.

In the event of a loss of coolant accident due to a break of the outlet line, the inherent compensation characteristic of the invention increases the hold down force at the time that the high flow is tending to lift the assemblies. In the event of an inlet line loss of coolant accident, the reverse force on the piston causes the piston to disengage from the seal plate structure, thereby providing a flow path for the steam to pass to the broken inlet connection without passing downwardly through the core and forcing water out.

DESCRIPTION OF THE PREFERRED EMBODIMENT

Figure 1:
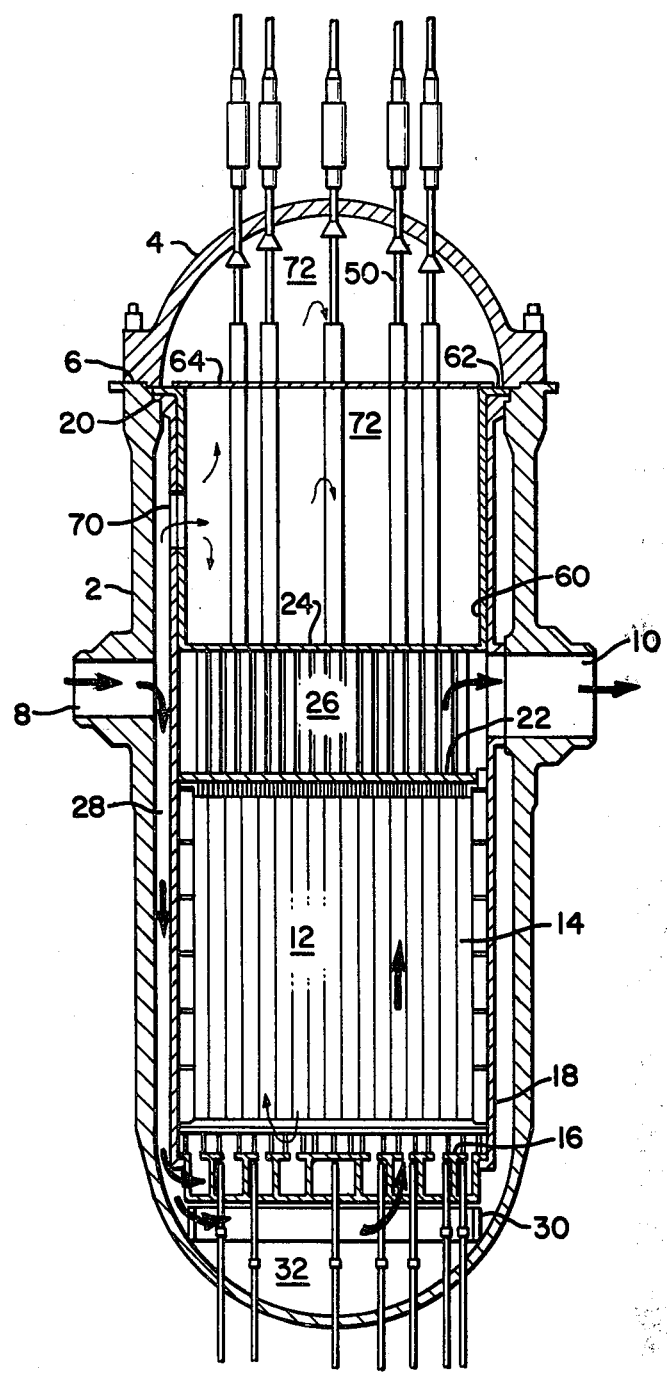
FIG. 1 is a general arrangement of the nuclear reactor.
Figure 3:
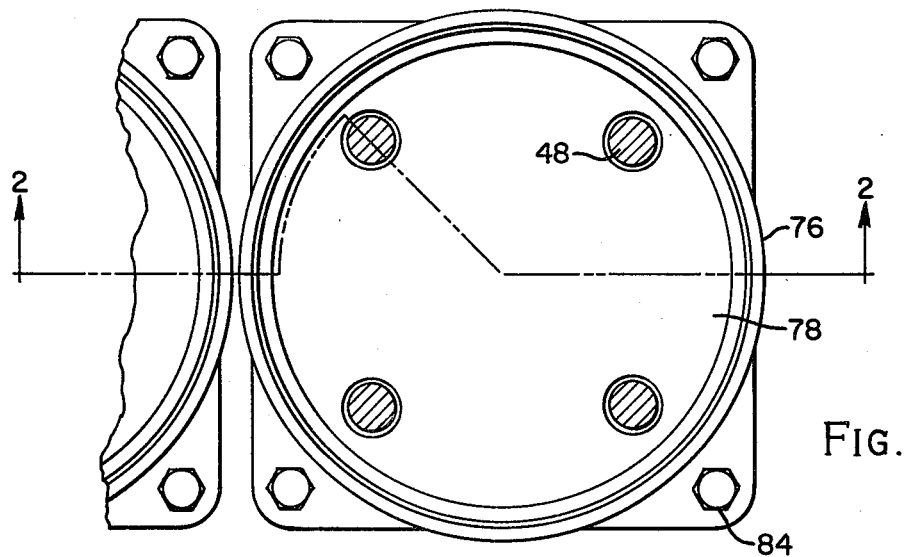
FIG. 3 is a plan view of the hold down structure.
Figure 2:
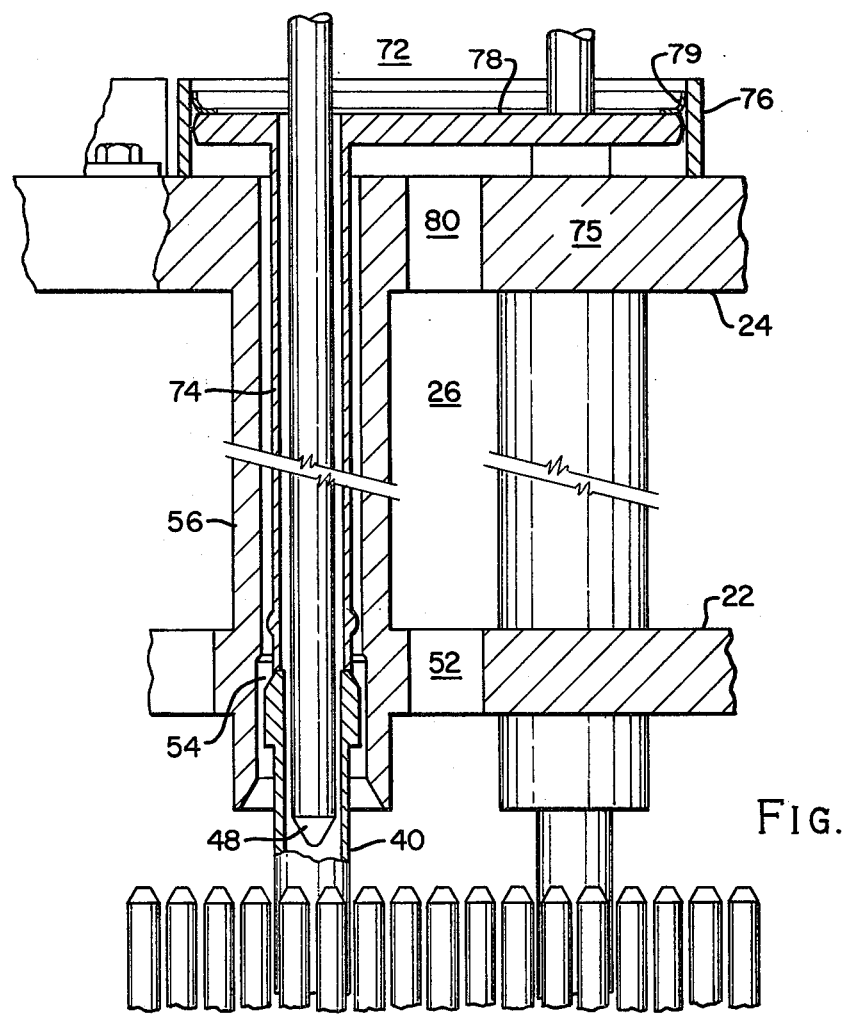
FIG. 2 is a sectional elevation showing the hold down structure.

A reactor vessel body 2 and a reactor vessel head 4 are joined by a bolted connection at flange 6. The reactor vessel body has an inlet opening 8 and an outlet opening 10 for flow of coolant water therethrough.

A core 12 is comprised of a plurality of fuel assemblies 14, each of which is comprised of a plurality of elongated fuel rods. The core is supported on the core support assembly 16 which is in turn supported by the core support barrel 18. This core support barrel is supported by flange 20 from the reactor vessel body 2 at a location adjacent the flange 6.

Immediately above the core 12 is a fuel assembly alignment plate 22 which serves to engage the upper ends of the fuel assemblies and to maintain alignment thereof. A seal plate structure 24 is located above the alignment plate, thereby defining the outlet plenum 26.

After the coolant enters through inlet opening 8 a first quantity comprising the bulk of the flow passes downwardly through the annular space 28 between the reactor vessel and the core support barrel. This flow passes downwardly through the flow skirt 30 into an inlet plenum 32 located below the core 12. The flow passes upwardly through the core and through openings in the alignment plate 22 into the outlet plenum 26.

From here the flow passes out through outlet opening 10 to a steam generator (not shown).

Each of the fuel assemblies 14 contain within their structure four control rod guide tubes 40 which pass through the entire length of the fuel assembly. These guide tubes extend upwardly above the upper fuel assembly end plate (not shown).

Finger shaped control rods 48 are vertically movable within the guide tubes 40 of the fuel assemblies. Each of these rods individually extends to an elevation above the seal plate 24 at which location they may be joined in subgroupings to the control rod extension 50.

In addition to the flow holes 52, the alignment plate 22 also has openings 54 through which the control rods pass. The extensions of the guide tube 40 pass into these openings. This joint should be such as to take horizontal forces so that the fuel assemblies can be aligned, and must permit vertical movement to allow for expansion of the different fuel assemblies.

Control rod shroud tubes 56 pass through the outlet plenum 26 and may be welded to the alignment plate 22 and the seal plate structure 24. These shroud tubes surround and protect the control rods from the effects of cross flow through the plenum 26.

Since the seal plate structure 24 is used not only as a seal plate but also as part of the structural arrangement for the upper guide assembly it is supported from barrel 60 to form a more rigid structure. Furthermore, it permits the entire structure including the fuel assembly alignment plate 22 to be removed when refueling to expose the fuel assemblies. This barrel 60 is supported by flanges 62 resting on flanges 20 of the core support barrel. The upper guide structure support plate 64 is open to permit flow therethrough.

A flow opening 70 is provided through the core support barrel and also through the upper guide assembly barrel so that a second minor portion of the flow entering the reactor vessel passes into a high pressure plenum 72. The flow then passes downwardly through the push rods 74 into the fuel assembly control rod guide tubes 40. This second minor portion of flow continues through the length of the fuel assemblies inside the guide tube to a location near the bottom of core 12 where it passes outwardly joining the first main portion of flow. These two flows are then combined and the total quantity passes upwardly through the core 12 and outlet plenum 26.

It can be seen the two parallel flow paths exist between the inlet 8 and the bottom of core 12. The pressure drop is essentially established by the larger first portion of flow passing down through the annular space 28. Because of the fluid flow a high pressure is established at inlet 8, an intermediate pressure at the core 12 inlet, and a low pressure at outlet 10. The remaining portion of the flow passing through the other path experiences the same pressure drop with the flow being established by the geometry of the flow path. The high pressure plenum 72 is in direct fluid communication with the inlet 8 so that this portion of the flow path is of low resistance and, therefore, has a relatively low pressure drop. The portion of the flow path through the assembly shroud and ultimately through the guide tubes 40 should have a major portion of the available pressure drop. This tends to maintain the pressure in the high pressure plenum 72 at a relatively high level, approximating the pressure at inlet 8.

The seal plate structure 24 is comprised of the seal plate 75 itself and vertical plate extensions 76. These extensions are located above the fuel assembly to be held down and in the embodiment are circular in shape. Piston 78 slidingly seals against the inner vertical surface of the extensions. A flexible seal 79 may be located around the periphery of the piston to improve the seal between the piston and the vertical extensions.

The piston 78 is connected to the push rods 74 in such a manner as to permit the piston to exert a downward force on the push rods. In the illustrated embodiment the piston is securely welded to the push rod. Each assembly has located there within four control rods and four control rod guide tubes. Accordingly, there are four push rods 74 for each fuel assembly, these four push rods being mounted on a single piston 78.

Opening 80 is provided in this seal plate structure within the confines of the vertical extending lip 76. This places the underside of the piston in direct fluid communication with the outlet from the reactor, thereby resulting in a low pressure beneath the piston.

The vertical extensions of the seal plate structure may be bolted as indicated with bolts 84. The connection between the extensions and the seal plate should be as tight as possible to preclude leakage through the joint.

It can be seen that a flow of coolant may pass from the high pressure plenum 72 downwardly along the control rods between the control rods and the push rod 74. This coolant then passes on through the control rod guide tubes. Any leakage between the piston and the seal plate extensions passes through opening 80 to the outlet region. Accordingly, a high pressure from plenum 72 which approximates the reactor vessel inlet pressure is applied to the upper surface of the piston while a low pressure approximating the pressure at the reactor vessel outlet is imposed on the lower surface of the piston. This differential pressure exerts a downward force through the push rods 74 which bear upon the upper surface of control rod guide tubes 40 for the purpose of holding down the fuel assemblies. Any variation in flow which would tend to increase the upward force on the fuel assemblies is reflected in an increased pressure drop through the core. This automatically increases the pressure differences across the piston and, therefore, the hold down force.

In assembling the reactor the fuel assemblies are in place while the alignment plate and seal plate are installed as a unit. The minor chamfers illustrated on the top of the control rod guide tube are those which are used in normal practice and are sufficient to guide the fuel assemblies within the alignment plate. No critical clearances are required at this location, the critical clearance being maintained above the seal plate between the piston and the seal plate extensions, where the apparatus is readily excessible.

In the event of a loss of coolant accident involving the breaking of the outlet line the piston hold down force is inherently increased. If the loss of coolant accident involves the break of the inlet line the pressure at the reactor vessel inlet, and, therefore, the pressure in high pressure plenum 72, is sharply reduced. The reverse flow on the piston raises it from its position out of contact with the seal plate extension 76, thereby permitting a flow from the core outlet up through plenum 72 to inlet 8. This minimizes the loss of water from the core which would occur if the steam were required to force its way backwardly through the core.

The extreme simplicity of the apparatus can be seen in the area of the primary coolant flow. In fact, there is no increase in the structure beyond that already required to align the fuel assemblies. There is also minimal affect on the design of the alignment plate so that the openings 52 may be generously sized, thereby permitting low pressure drop and low turbulence in the primary coolant flow.

What is claimed is:

1. In a nuclear reactor having; a reactor vessel having an inlet and an outlet; a core supported within said reactor vessel, and formed of a plurality of vertically elongated fuel assemblies; a mass flow of coolant from the inlet, upwardly through said core, and to the outlet, whereby a high pressure is established at the inlet, an intermediate pressure at the core inlet, and a low pressure at the outlet; a horizontal seal plate structure within said reactor vessel dividing said reactor vessel into a high pressure plenum above said seal plate and a low pressure plenum below said seal plate, said high pressure plenum being in direct fluid communication with the reactor vessel inlet, and said low pressure plenum being in direct fluid communication with the reactor vessel outlet; a fuel assembly hold down apparatus comprising: a push rod in vertical alignment with a fuel assembly and in contact with the upper end thereof; a piston attached to the upper portion of said push rod, said push rod restraining relative downward movement of said piston; vertical surface of said seal plate structure surrounding an opening therein and in sliding sealing relationship with said piston, whereby the upper surface of said piston is exposed to the high pressure plenum and the lower surface of said piston is exposed to the low pressure plenum.

2. An apparatus as in claim 1 wherein said seal plate structure comprises a seal plate and vertical extensions on said seal plate having vertical surface thereon, said piston located above said seal plate and in sliding contact with said vertical extensions.

3. An apparatus as in claim 2 wherein said piston and said push rod are rigidly connected.

4. An apparatus as in claim 3 wherein said fuel assembly includes a control rod guide tube; said nuclear reactor having finger control rods vertically movable through said control rod guide tubes and extending upwardly into said high pressure plenum; said push rod being tubular, and surrounding one of said control rods, and in contact with the upper end of said control rod guide tube.

5. An apparatus as in claim 4 having also a horizontal alignment plate below said seal plate forming an outlet plenum therebetween, said alignment plate having openings therein engaging said control rod guide tubes for horizontal alignment of the fuel assemblies; a shroud tube surrounding said push rod and joining said seal plate and said alignment plate.

6. An apparatus as in claim 5 wherein said seal plate has an opening therethrough within the confines of said vertical extension, providing direct fluid communication between the lower surface of said piston and said outlet plenum.

7. An apparatus as in claim 5 having a plurality of control rod guide tubes and push rods for a single fuel assembly.

* * * * *